(12) United States Patent
Petit

(10) Patent No.: US 6,332,012 B1
(45) Date of Patent: *Dec. 18, 2001

(54) GRID STRAP FOR A NUCLEAR FUEL ASSEMBLY, AND A GRID INCLUDING SUCH STRAPS

(75) Inventor: Bernard Petit, Brignais (FR)

(73) Assignees: Framatome; Compagnie Generale des Matieres Nucleaires, both of (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/113,298

(22) Filed: Jul. 10, 1998

(30) Foreign Application Priority Data

Jul. 11, 1997 (FR) .................................. 97 08874

(51) Int. Cl.$^7$ ........................................ G21C 3/18
(52) U.S. Cl. .................. 376/442; 376/352; 376/438; 376/439
(58) Field of Search .................... 376/439, 441, 376/442, 352, 438

(56) References Cited

U.S. PATENT DOCUMENTS

| 4,756,878 | * | 7/1988 | King et al. | 376/439 |
| 4,775,510 | * | 10/1988 | Bryan | 376/439 |
| 4,923,669 | * | 5/1990 | DeMario | 376/442 |
| 5,444,748 | * | 8/1995 | Beuchel et al. | 376/439 |
| 5,490,192 | * | 2/1996 | Nakajima et al. | 376/439 |

FOREIGN PATENT DOCUMENTS

| 0273183 | | 7/1988 | (EP) . | |
| 0304724 | | 3/1989 | (EP) . | |
| 2191209 | | 2/1974 | (FR) . | |
| 1169792 | * | 7/1986 | (JP) | 376/442 |
| 9212046 | | 7/1992 | (WO) . | |

* cited by examiner

Primary Examiner—Harvey E. Behrend
(74) Attorney, Agent, or Firm—Connolly Bove Lodge & Hutz LLP

(57) ABSTRACT

A nuclear fuel assembly grid has a plurality of mutually interleaved straps forming an array of fuel rod receiving cells. Each strap is formed with regularly distributed slots for interleaving with other straps of the grid. The strap has dimples located between some at least of the slots for maintaining fuel rods in the cells. An upstream portion of the plate extending in transverse relation to a coolant flow direction has a double sided concave chamfer.

9 Claims, 1 Drawing Sheet

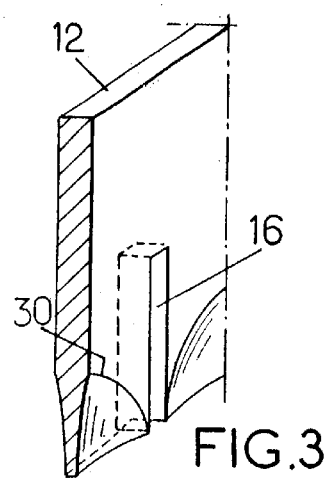
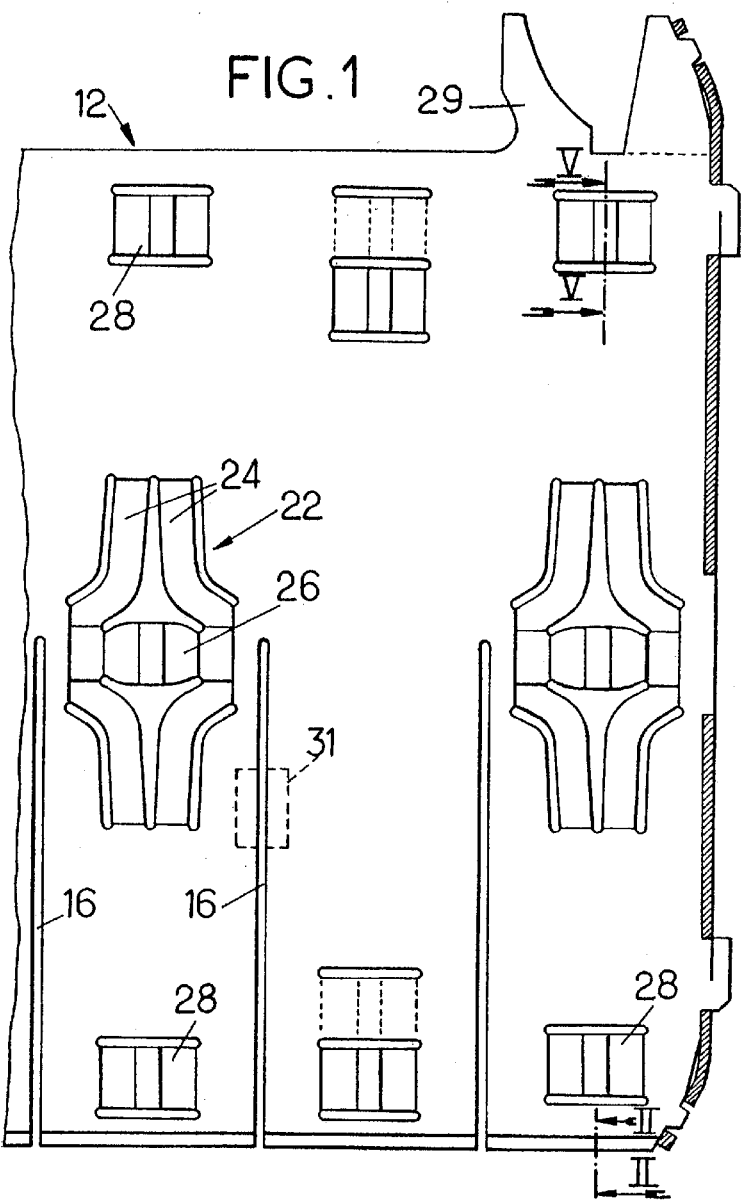
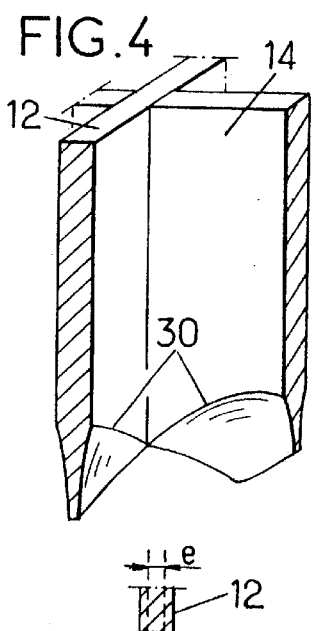
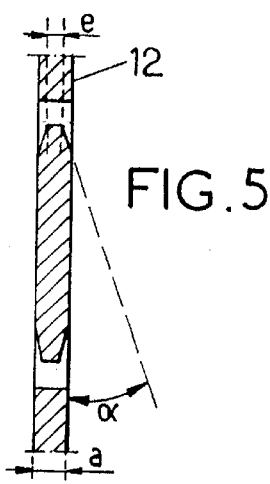
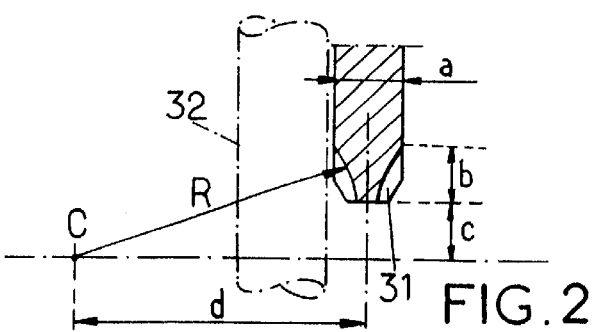

GRID STRAP FOR A NUCLEAR FUEL ASSEMBLY, AND A GRID INCLUDING SUCH STRAPS

BACKGROUND OF THE INVENTION

The invention relates to grids for holding fuel rods in a nuclear fuel assembly, and in particular to grids used in pressurized water reactors and serving to hold rods at the nodes of a regular array, generally a square array.

The invention relates in particular to making straps or plates which are assembled together to make up such grids, generally via half-depth slots.

The grids of an assembly define common cells which receive the rods and other cells having guide tubes passing therethrough, which tubes are often welded to the grids. Conventionally, in grids used for holding rods longitudinally, rigid dimples or bosses for abutment with the rods are provided in two of the four faces of a common cell for receiving a rod, and two holding springs are cut out from or fitted to the other two faces so as to press a rod onto the dimples. Between grids designed to hold fuel rods at the nodes of a regular array, it is possible to interpose grids provided with fins that serve only to improve mixing of coolant streams flowing along the assembly.

It is important to reduce the headloss caused by the presence of the grids. For this purpose, proposals have already been made to round those edges of the straps which are situated upstream in the flow direction (EP-A-0 273 183). However, that convex shape gives rise to turbulence which dissipates energy. The use of straight chamfers does not solve the problem associated with such turbulence.

SUMMARY OF THE INVENTION

An object of the invention is to provide a grid strap that gives rise to reduced headloss, and that is easy to fabricate. To this end, the invention proposes a strap whose upstream edge presents, at least in each face that is to be adjacent to a cell, a chamfer that is of concave profile.

This structure increases the "transparency" of grids and facilitates the passage of coolants along the cells around the rods.

Straps or plates of a grid that is to hold rods are advantageously of the structure described in French Patent No. 2,766,003, assigned to Framatome et al. Each strap may include rod-holding springs each having two resilient strips cut out from the wall of the strap and integral therewith, each extending transversely to the strap and connected to the strap at both ends, the strips projecting towards the inside of the cell concerned, at least in the free state, and being connected to each other in the middle by a transverse bridge that projects relative to the two strips. These springs are designed to press the rods into the dimples, which are likewise in the form of bridges. Under such circumstances, it is advantageous to provide rectilinear chamfers upstream from the dimples and/or the bridges.

The concave chamfers on the upstream sides of the straps can be of various shapes. They may be of constant length. They may be of a length that varies from a maximum, halfway between the slots, to a minimum close to the slots. The upstream edge of a plate may be defined by an edge which is concave between each pair of slots. In general, on a plate provided with bosses, the length of the chamfer is shorter than the distance between the bottom edge of the strap and the nearest boss. Nevertheless, the chamfer may extend over the entire strap, from the upstream edge to the downstream edge thereof.

To avoid weakening the upstream edge, the strap must retain a certain degree of thickness along the upstream edge; nevertheless, the thickness is preferably no greater than about half the thickness of the strap in its ordinary portion in order to ensure that the effect of the chamfers is significant.

The above characteristics which are advantageously usable in combination but which can be used separately, together with other characteristics, will become clearer on reading the following description of particular embodiments given by way of example. The description refers to the accompanying drawings.

BRIEF DESCRIPTION OF THE DRAWINGS

FIG. 1 is a perspective view of a fraction of a plate provided with springs and bosses, to which the invention is applicable;

FIG. 2 is a detail view in section on line II—II of FIG. 1, on a different scale;

FIGS. 3 and 4 are perspective views showing variants of FIG. 1; and

FIG. 5 is a section view on line V—V of FIG. 1.

DETAILED DESCRIPTION OF PREFERRED EMBODIMENTS

The strap 12 shown in part in FIG. 1 has a structure very similar to that described in the abovementioned French patent. It has notches 16 designed to co-operate with straps constituting a second set. Each zone situated between two notches and designed to separate two cells for rods carries springs 22 and bearing bosses 28. Each spring is made up of two resilient strips 24 cut out from the strap and interconnected in the middle by a transverse bridge 26.

In the flow direction, each spring 22 is positioned between two bosses 28, likewise in the form of bridges. The bridges 26 and the bosses 28 may be of the same shape.

The edge of the plate that is to be situated downstream in the flow direction, once the plate is in provided in a grid, may carry mixing fins 29.

To increase the transparency of a grid built up from crossed straps, concave-shaped chamfers are provided at least in the vicinity of the upstream edge of the strap. In general, the flow in a pressurized water reactor is upwards and the upstream edge is constituted by the bottom edge. FIGS. 1 and 2 show chamfers 31 that are relatively easy to make and that do not weaken the edge excessively. The chamfering of each face extends over a distance b that is slightly less than the thickness a of the strap. For a grid made up of straps of the zirconium alloy known as Zircaloy 4, and having a thickness a=0.425 mm, the length b may be 0.35 mm.

The upstream edge must not be too thin, as otherwise the edges will be weakened and may become indented in the event of an impact. However, the chamfers must be large enough to increase the transparency of the grid to a significant extent. In practice, the thickness along the edge will be selected to be close to half the common thickness a.

Although various concave profiles can be used to make the chamfer, it is advantageous to use a shape that is in the form of a circular sector having its center situated beyond the upstream face of the grid constituted by the straps of the invention. In particular, it is possible to use a cylindrical shape of radius R and center C situated at a distance c beneath the upstream edge of the strap, where c is of the same order as b, and at a distance d from the axis of the strap that is equal to several times a. In practice, good results have been obtained with a strap of thickness a=0.425 mm, when c=0.3 mm, and d=2.1 mm.

The chamfers may be provided either on either side of the crossings with orthogonal straps, or else along the full length of a strap. The straps may be attached together by welding either on the downstream face, or using beads along the dihedral angles, or indeed in windows such as 33.

In the variant shown in FIG. 3, which is not to scale for reasons of clarity, the chamfer is of varying height. It is defined by a line 30 starting from the upstream edge close to each slot 16 and reaching a maximum distance from said edge in the middle of the face of a cell. Under such circumstances, the thickness of the edge is at a minimum in the middle of the wall of a cell and reaches the common thickness at the points where the strap crosses other straps.

In the embodiment shown in FIG. 4, again not to scale, each chamfer for a strap 12 or 14 is again defined by a line 30 extending from the edge of the strap at its cross-points with two other straps. In addition, the upstream edge of the strap is neither of constant thickness nor rectilinear. This upstream edge has a curved shape serving to recenter the streams of coolant liquid towards the rods, such as the rod 32 shown diagrammatically in FIG. 2.

To further improve the transparency of a grid as shown in FIG. 1, the bridges 26 and the bosses 28 may also be chamfered. However, under such circumstances, it is possible to use chamfers that are straight and plane, given the small sizes thereof. By way of example, FIG. 5 shows chamfers that can be formed on the upstream and downstream edges of a bridge, prior to the sheet being deformed, so as to constitute the bosses and the springs. An angle α of the chamfers equal to about 20° has given good results. The thickness e of the edges can be that of the upstream edge of the strap, i.e., no more than 0.5 mm for a=0.425 mm, for example.

What is claimed is:

1. In a nuclear fuel assembly grid including a plurality of mutually interleaved flat straps forming an array of fuel rod receiving cells, a strap formed with slots regularly distributed along an elongate direction of the plate for interleaving with other straps of the grid, said strap having dimples located between some at least of said slots for maintaining fuel rods in said cells, wherein:

said strap has an upstream portion extending in said elongate direction and in transverse relation to a coolant flow direction in the grid, said upstream portion having an upstream edge interrupted by said slots and having a concave chamfer extending from said upstream edge of the strap on each side thereof along the whole length of said upstream edge, each said chamfer has a length in the direction of flow which varies from a maximum value half-way between two successive said slots and a minimum value in the vicinity of the slots, and said upstream edge has a thickness which is minimum midway between said two successive slots.

2. In a nuclear fuel assembly grid including a plurality of mutually interleaved flat straps forming an array of fuel rod receiving cells, a strap formed with slots regularly distributed along an elongate direction of the plate for interleaving with other straps of the grid, said strap having dimples located between some at least of said slots for maintaining fuel rods in said cells, wherein said strap has an upstream portion extending in said elongate direction and in transverse relation to a coolant flow direction in the grid which has a concave chamfer extending along the whole length of said upstream edge from an upstream edge of the strap on each side thereof and wherein the upstream edge of the strap has a concave shape between the slots of each pair of successive said slots.

3. A strap according to claim 1, wherein said strap has a thickness along the upstream edge which is at least equal to half the thickness in a current portion of the strap.

4. A strap according to claim 1, wherein each said chamfer has a cross-sections along planes parallel to said slots which are defined by lines of semi-circular shape whose center is located beyond the upstream edge, at a distance from the upstream edge which is substantially equal to an height of the chamfer and is at a distance from an axis of the strap which is several times greater than the thickness of the strap.

5. A strap according to claim 1, wherein the dimples are in the form of bridges directed parallel to said upstream edge and having edge portions chamfered on both sides.

6. A strap according to claim 5, wherein the edges of the bridges have a same thickness as a thickness of the upstream edge of the strap.

7. A nuclear fuel assembly grid including two sets each consisting of mutually parallel straps formed with regularly distributed slots, the straps of one of the sets being orthogonal to and interleaved with the straps of the other set, for defining cells for fuel rods, the slots of the straps of a first one of said sets opening into and interrupting an upstream edge of said straps and the slots of the straps of a second one of said sets opening into and interrupting a downstream edge of said straps, each said chamfer having a length along the coolant flow direction which varies from a maximum value half-way between two successive said slots to a minimum value in the vicinity of the slots, and each of said straps of the first set having an upstream portion, extending in transverse relation to a coolant flow direction in the grid, having two sides formed with symmetrical concave chamfers extending from the upstream edge of the strap, and each of said straps of each of the sets having a plurality of dimples each located midway between two successive said slots and each for maintaining one of said fuel rods in a respective one of said cells and each said dimple being formed as a bridge having chamfered edges extending parallel to said upstream edge of the respective strap.

8. A nuclear fuel assembly according to claim 7, wherein each of said chamfers has cross-sections along planes parallel to said slots which are defined by lines of semi-circular shape whose center is located beyond the upstream edge, at a distance from the upstream edge which is substantially equal to a height of the chamfer and is at a distance from an axis of the strap which is several times greater than the thickness of the strap.

9. A nuclear fuel assembly grid including two sets each consisting of a plurality of mutually parallel straps formed with regularly distributed slots, the straps of one of the sets being orthogonal to and interleaved with the straps of the other set, for defining cells for fuel rods, each of said straps having an upstream portion, extending in transverse relation to a coolant flow direction in the grid and having two sides formed with symmetrical concave chamfers extending from an upstream edge of the strap, and each of said straps having a plurality of dimples each located midway between two successive said slots and each for maintaining one of said fuel rods in a respective one of said cells, and each said dimple being formed as a bridge having chamfered edges extending parallel to said upstream edge.

* * * * *

UNITED STATES PATENT AND TRADEMARK OFFICE
CERTIFICATE OF CORRECTION

PATENT NO. : 6,332,012 B1
DATED : December 18, 2001
INVENTOR(S) : Bernard Petit

It is certified that error appears in the above-identified patent and that said Letters Patent is hereby corrected as shown below:

Title page,
Item [57], ABSTRACT,
Line 5, change "some at least" to -- at least some --
Line 6, change "uptstream" to -- upstream --

Column 1,
Lines 26 and 36, change "headloss" to -- head loss --

Column 4,
Line 9, change "has a cross-sections" to -- has a cross-section --

Signed and Sealed this

Twenty-first Day of September, 2004

JON W. DUDAS
*Director of the United States Patent and Trademark Office*